United States Patent
Okada

(10) Patent No.: US 12,301,984 B2
(45) Date of Patent: May 13, 2025

(54) IMAGE CAPTURE APPARATUS AND CONTROL METHOD

(71) Applicant: Canon Kabushiki Kaisha, Tokyo (JP)

(72) Inventor: Yuki Okada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 18/475,378

(22) Filed: Sep. 27, 2023

(65) Prior Publication Data

US 2024/0163550 A1   May 16, 2024

(30) Foreign Application Priority Data

Nov. 15, 2022   (JP) ................. 2022-182799

(51) Int. Cl.
| | | |
|---|---|---|
| *H04N 23/60* | (2023.01) | |
| *H04N 23/63* | (2023.01) | |
| *H04N 23/661* | (2023.01) | |
| *H04N 23/667* | (2023.01) | |

(52) U.S. Cl.
CPC ........... *H04N 23/64* (2023.01); *H04N 23/633* (2023.01); *H04N 23/661* (2023.01); *H04N 23/667* (2023.01)

(58) Field of Classification Search
CPC .... H04N 23/66; H04N 23/667; H04N 23/661; H04N 23/633; H04N 23/64
See application file for complete search history.

(56) References Cited

U.S. PATENT DOCUMENTS

| | | | |
|---|---|---|---|
| 10,972,782 B2 | 4/2021 | Nakajima | |
| 2011/0276811 A1* | 11/2011 | Ueda | ........ G06F 1/266 713/300 |
| 2017/0230582 A1* | 8/2017 | Naka | ........ G03B 13/02 |
| 2023/0110447 A1 | 4/2023 | Fujihara | |

FOREIGN PATENT DOCUMENTS

| | | |
|---|---|---|
| JP | 2019169869 A | 10/2019 |
| JP | 2021153813 A | 10/2021 |

* cited by examiner

*Primary Examiner* — Xi Wang
(74) *Attorney, Agent, or Firm* — Venable LLP

(57) ABSTRACT

An image capture apparatus transitions to a standby state where a predetermined function that controls the image capture apparatus via a general-purpose interface can be executed in a case where a request for second information for controlling the image capture apparatus has been received from an information processing apparatus in response to transmission of first information indicating that the image capture apparatus can be controlled via the general-purpose interface to the information processing apparatus, and provides a notification indicating that the predetermined function cannot be executed without transitioning to the standby state where the predetermined function can be executed in a case where the request for the second information has not been received from the information processing apparatus in response to transmission of the first information to the information processing apparatus.

13 Claims, 6 Drawing Sheets

FIG. 5A

|  | COMPATIBLE | INITIAL VALUE | MINIMUM VALUE | MAXIMUM VALUE |
|---|---|---|---|---|
| BRIGHTNESS | ○ | 50 | 0 | 100 |
| MAGNIFICATION FACTOR | ○ | 50 | 0 | 100 |
| TINT | ○ | 50 | 0 | 100 |
| SHARPNESS | × | 0 | 0 | 100 |

FIG. 5B

|  | COMPATIBLE | INITIAL VALUE | MINIMUM VALUE | MAXIMUM VALUE |
|---|---|---|---|---|
| BRIGHTNESS | × | 0 | 0 | 0 |
| MAGNIFICATION FACTOR | × | 0 | 0 | 0 |
| TINT | × | 0 | 0 | 0 |
| SHARPNESS | × | 0 | 0 | 0 |

IMAGE CAPTURE APPARATUS AND CONTROL METHOD

BACKGROUND OF THE INVENTION

Field of the Invention

The present invention relates to techniques to control an image capture apparatus via a general-purpose interface.

Description of the Related Art

A Universal Serial Bus (USB) video class (UVC) and a USB audio class (UAC) have been known as functions that enable control of an image capture apparatus such as a digital camera via a general-purpose interface like USB. The UVC function and the UAC function (hereinafter, a UVC/UAC function) are functions in which, by simply connecting an image capture apparatus such as a digital camera and an information processing apparatus such as a personal computer (PC) via USB, audio data and image data can be distributed from the image capture apparatus to the information processing apparatus, and shooting parameters of the image capture apparatus can be controlled during, for example, an online meeting, without requiring a user to install a driver.

Furthermore, when connected to an information processing apparatus that is compatible with the UVC/UAC function, the image capture apparatus provides the user with a notification indicating that it has transitioned to a standby state where the UVC/UAC function can be executed by displaying the notification on, for example, a display unit. It is described in Japanese Patent Laid-Open No. 2021-153813 that, when an operation to display a menu screen has been performed during the streaming of game images, distribution of game images is temporarily suspended, and a transition is made to a standby state. It is described in Japanese Patent Laid-Open No. 2019-169869 that, in a case where wireless communication has been disconnected during the streaming of images and sounds, a transition is made to a state that displays a screen showing an image with a disconnection notification superimposed thereon.

As described above, an image capture apparatus connected to an information processing apparatus that is compatible with the UVC/UAC function provides a user with a notification indicating that it has transitioned to a standby state where the UVC/UAC function can be executed by displaying the notification on, for example, a display unit. Meanwhile, there is a case where the image capture apparatus similarly displays the indication that it has transitioned to a standby state also when an information processing apparatus that is not compatible with the UVC/UAC function is connected thereto; this gives rise to the possibility that a user mistakenly recognizes that the UVC/UAC function can be executed.

However, Japanese Patent Laid-Open No. 2021-153813 and Japanese Patent Laid-Open No. 2019-169869 do not control whether to cause an image capture apparatus to transition to a standby state where a predetermined function can be executed in accordance with whether an information processing apparatus connected via a general-purpose interface is compatible with the predetermined function that enables control of the image capture apparatus via the general-purpose interface.

SUMMARY OF THE INVENTION

The present invention has been made in consideration of the aforementioned problems, and realizes techniques whereby, in accordance with whether an information processing apparatus connected via a general-purpose interface is compatible with a predetermined function that enables control of an image capture apparatus via the general-purpose interface, whether to cause the image capture apparatus to transition to a standby state where the predetermined function can be executed is controlled.

In order to solve the aforementioned problems, the present invention provides an image capture apparatus comprising: a connection unit that connects to an information processing apparatus via a general-purpose interface so as to enable communication with the information processing apparatus; and a control unit that transitions to a standby state where a predetermined function that controls the image capture apparatus via the general-purpose interface can be executed in a case where a request for second information for controlling the image capture apparatus has been received from the information processing apparatus in response to transmission of first information indicating that the image capture apparatus can be controlled via the general-purpose interface to the information processing apparatus, and provides a notification indicating that the predetermined function cannot be executed without transitioning to the standby state where the predetermined function can be executed in a case where the request for the second information has not been received from the information processing apparatus in response to transmission of the first information to the information processing apparatus.

In order to solve the aforementioned problems, the present invention provides a method of controlling an image capture apparatus, comprising: connecting to an information processing apparatus via a general-purpose interface so as to enable communication with the information processing apparatus; transitioning to a standby state where a predetermined function that controls the image capture apparatus via the general-purpose interface can be executed in a case where a request for second information for controlling the image capture apparatus has been received from the information processing apparatus in response to transmission of first information indicating that the image capture apparatus can be controlled via the general-purpose interface to the information processing apparatus; and providing a notification indicating that the predetermined function cannot be executed without transitioning to the standby state where the predetermined function can be executed in a case where the request for the second information has not been received from the information processing apparatus in response to transmission of the first information to the information processing apparatus.

In order to solve the aforementioned problems, the present invention provides a non-transitory computer-readable storage medium storing a program for causing a computer to function as an image capture apparatus comprising: a connection unit that connects to an information processing apparatus via a general-purpose interface so as to enable communication with the information processing apparatus; and a control unit that transitions to a standby state where a predetermined function that controls the image capture apparatus via the general-purpose interface can be executed in a case where a request for second information for controlling the image capture apparatus has been received from the information processing apparatus in response to transmission of first information indicating that the image capture apparatus can be controlled via the general-purpose interface to the information processing apparatus, and provides a notification indicating that the predetermined function cannot be executed without transitioning to the standby state where the predetermined function can be executed in a case where the request for the second information has not been received from the information processing apparatus in response to transmission of the first information to the information processing apparatus.

According to the present invention, in accordance with whether an information processing apparatus connected via a general-purpose interface is compatible with a predetermined function that enables control of an image capture apparatus via the general-purpose interface, whether to cause the image capture apparatus to transition to a standby state where the predetermined function can be executed can be controlled.

Further features of the present invention will become apparent from the following description of exemplary embodiments (with reference to the attached drawings).

BRIEF DESCRIPTION OF THE DRAWINGS

FIGS. 5A and 5B are diagrams illustrating a control descriptor of the present embodiment.

DESCRIPTION OF THE EMBODIMENTS

Figure 1A:
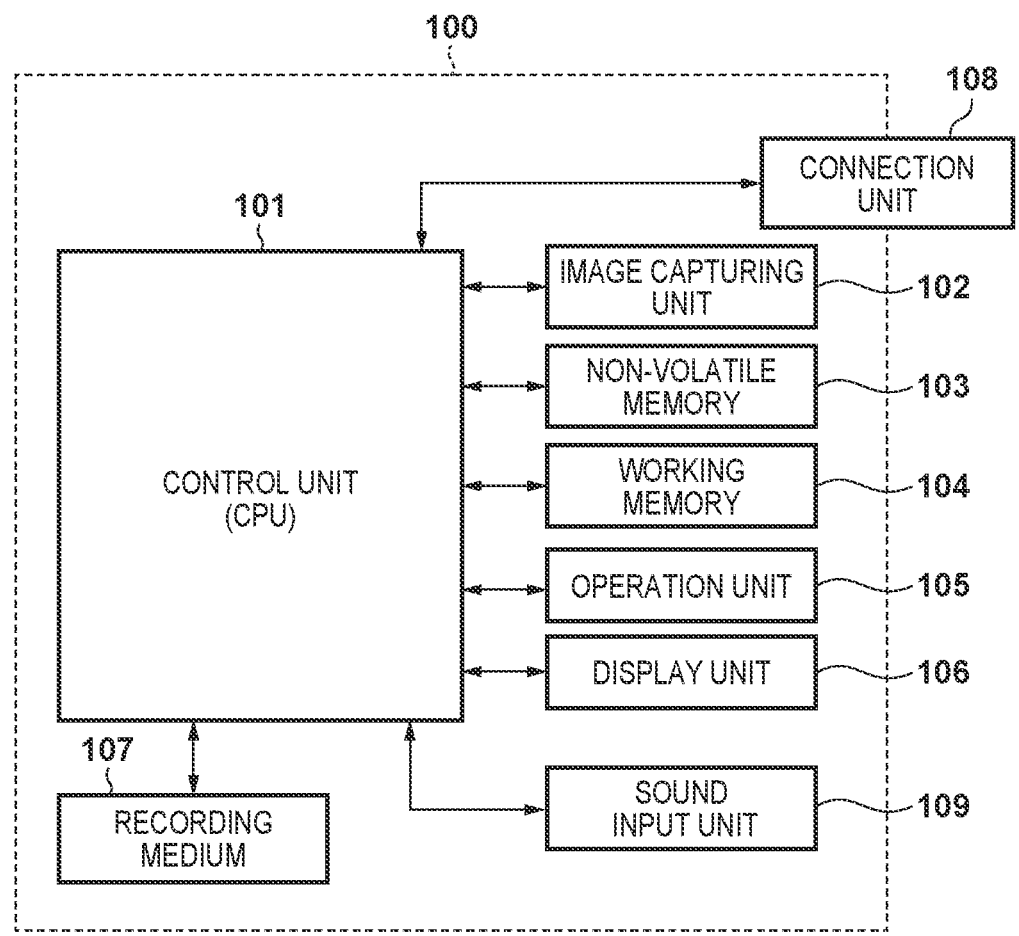
FIG. 1A is a block diagram showing a configuration of an image capture apparatus according to the present embodiment.

The following describes favorable embodiments of the present invention in detail based on the attached drawings. Note that the embodiments described below are examples for realizing the present invention, and they are to be modified or changed as appropriate depending on configurations of apparatuses to which the present invention is applied and on various types of conditions; the present invention is not limited to the following embodiments. Furthermore, parts of each embodiment described below may be configured in combination as appropriate.

A system of the present embodiment includes an image capture apparatus 100 such as a digital camera, and an information processing apparatus 200 such as a personal computer (PC). The image capture apparatus 100 and the information processing apparatus 200 are connected via a general-purpose interface such as Universal Serial Bus (USB) so as to be communicate with each other. In a case where the image capture apparatus 100 and the information processing apparatus 200 are connected via USB, the image capture apparatus 100 operates as a USB device, whereas the information processing apparatus 200 operates as a USB host.

Furthermore, in a case where the image capture apparatus 100 and the information processing apparatus 200 of the present embodiment are compatible with a function that has been standardized based on USB, such as a USB video class (UVC) and a USB audio class (UAC) (hereinafter, a UVC/UAC function), the information processing apparatus 200 can control shooting parameters of the image capture apparatus 100, whereas the image capture apparatus 100 can perform shooting based on the shooting parameters set by the information processing apparatus 200, and transmit image data and audio data to the information processing apparatus 200.

In the present embodiment, whether the image capture apparatus 100 transitions to a standby state where the UVC/UAC function can be executed is controlled in accordance with whether the information processing apparatus 200 that is connected to the image capture apparatus 100 via USB is compatible with the UVC/UAC function. Furthermore, in the present embodiment, in a case where the information processing apparatus 200 that is connected to the image capture apparatus 100 via USB is not compatible with the UVC/UAC function, the image capture apparatus 100 provides a user with a notification indicating that the UVC/UAC function cannot be executed without transitioning to the standby state where the UVC/UAC function can be executed.

Note that although the present embodiment is described using USB as an example of a general-purpose interface, an interface other than USB may be used.

<Configuration of Image Capture Apparatus 100>

First, a configuration and functions of the image capture apparatus 100 of the present embodiment will be described with reference to FIG. 1A.

Note that although the present embodiment is described in relation to the image capture apparatus such as a digital camera, no limitation is intended by this; an information communication terminal such as a smart device, which is a type of a mobile telephone, and a tablet device quipped with a camera function, a Web camera such as a surveillance camera, a medical camera, and the like may be used.

A control unit 101 is a central processing unit (CPU) that performs integrated control on the entire image capture apparatus 100, and it realizes later-described communication processing and control processing by executing a program stored in a later-described nonvolatile memory 103. Note that the entire apparatus may be controlled by a plurality of items of hardware sharing processing, rather than the entire apparatus being controlled by the control unit 101.

An image capturing unit 102 includes a lens assembly that includes a zoom lens and a focus lens, and a shutter that has a diaphragm function. Furthermore, the image capturing unit 102 includes an image sensor comprised of, for example, a CCD or CMOS element that converts a subject image into electrical signals, and an A/D converter that converts analog image signals output from the image sensor into digital signals. Under control of the control unit 101, the image capturing unit 102 converts light of the subject image formed by the lenses included in the image capturing unit 102 into electrical signals with use of the image sensor, executes noise reduction processing and the like, and outputs image data comprised of digital signals.

The control unit 101 executes pixel interpolation, resize processing such as reduction, and color conversion processing with respect to image data captured by the image capturing unit 102. Furthermore, the control unit 101 generates an image file by compressing and encoding still image data to which image processing has been applied in accordance with, for example, a JPEG format, or by encoding moving image data using a moving image compression method such as an MP4 format, and records the image file into a recording medium 107. In the image capture apparatus 100 of the present embodiment, image data is recorded into the recording medium 107 in accordance with the standard of the Design rule for Camera File system (DCF).

The nonvolatile memory 103 is an electrically erasable and recordable memory; for example, an EEPROM or the like is used thereas. Constants for the operations of the control unit 101, a program, and the like are recorded in the nonvolatile memory 103. The program mentioned here denotes a program for executing communication processing and control processing, which will be described later in the present embodiment.

A working memory 104 is used as a working area to which constants and variables for the operations of the control unit 101, the program that has been read out from the nonvolatile memory 103, and the like are deployed. Furthermore, the working memory 104 is used as a buffer memory that temporarily holds image data captured by the image capturing unit 102, and an image display memory for a display unit 106.

An operation unit 105 is comprised of operation members that accept various types of operations from a user, such as various types of switches, buttons, and a touch panel. For example, as shown in FIG. 1B and FIG. 1C, the operation unit 105 includes a shutter-release button 105a for shooting images, a reproduction button 105b for reproducing shot images, a four-direction key 105c comprised of up, down, left, and right buttons for configuring various types of camera settings, and so forth. Furthermore, a touch panel 105d, which is formed integrally with the later-described display unit 106, is also included in the operation unit 105.

The shutter-release button 105a is turned ON and generates a first shutter switch signal SW1 in the middle of an operation thereon, that is to say, when depressed halfway down (a shooting preparation instruction). Upon receiving the first shutter switch signal SW1, the control unit 101 starts the operations of autofocus (AF) processing, automatic exposure (AE) processing, auto white balance (AWB) processing, preliminary flash emission (EF) processing, and so forth by controlling the image capturing unit 102. The shutter-release button 105a is also turned ON and generates a second shutter switch signal SW2 when the operation thereon is completed, that is to say, when fully depressed (a shooting instruction). Upon receiving the second shutter switch signal SW2, the control unit 101 starts a sequence of operations of shooting processing, from reading of signals from the image capturing unit 102 to writing of image data into the recording medium 107.

The display unit 106 displays viewfinder images at the time of shooting, displays shot images, and displays characters for interactive operations, among others. The display unit 106 is, for example, a display device such as a liquid crystal display and an organic EL display. The display unit 106 may be configured integrally with the image capture apparatus 100, or it may be an external apparatus connected to the image capture apparatus 100. It is sufficient that the image capture apparatus 100 be capable of connecting to the display unit 106, and that it have a function of controlling display on the display unit 106.

Image data output from the image capturing unit 102 and audio data output from a sound input unit 109 are recorded in the recording medium 107. Also, the control unit 101 reads out an image file and an audio file stored in the recording medium 107 in a reproduction mode. The recording medium 107 may be a memory card, a hard disk drive, or the like attached to the image capture apparatus 100, or it may be a flash memory or a hard disk drive built in the image capture apparatus 100. It is sufficient that the image capture apparatus 100 be at least capable of accessing the recording medium 107.

A connection unit 108 is an interface for connecting to an external apparatus such as the information processing apparatus 200 so as to enable communication with the information processing apparatus 200. The image capture apparatus 100 of the present embodiment can exchange data with an external apparatus via the connection unit 108. The image capture apparatus 100 of the present embodiment can perform shooting based on control information received from the information processing apparatus 200, and it can transmit image data generated by the image capturing unit 102 and audio data generated by the sound input unit 109 to the information processing apparatus 200 via the connection unit 108. The connection unit 108 of the present embodiment includes a wired connection interface such as USB. The control unit 101 realizes communication with an external apparatus by controlling the connection unit 108. A protocol for data communication can use, for example, the UVC/UAC function that has been standardized based on USB. Note that no limitation is intended by USB, and the connection unit 108 can include an infrared communication interface and a wireless communication interface such as Bluetooth® and Wireless USB. Furthermore, a wired connection interface such as HDMI and IEEE 1394 may be used.

The sound input unit 109 represents one or more microphones that are built in the image capture apparatus 100 or connected via an audio terminal; it converts analog audio signals that have been generated by collecting sounds around the image capture apparatus 100 into digital signals, and outputs the digital signals to the control unit 101. The control unit 101 generates audio data by executing various types of audio signal processing with respect to the digital signals generated by the sound input unit 109. The control unit 101 can transmit the audio data generated by the sound input unit 109 to an external apparatus via the connection unit 108.

<Configuration of Image Processing Apparatus 200>

Next, a configuration and functions of the information processing apparatus 200 of the present embodiment will be described with reference to FIG. 2.

Note that although the present embodiment is described in relation to an information processing apparatus such as a PC, no limitation is intended by this; it is permissible to use an information communication terminal such as a smart device, which is a type of a mobile telephone, and a tablet device equipped with a communication function, a wristwatch-type smartwatch, a wearable computer such as eyeglass-type smartglasses, and so forth.

The information processing apparatus 200 of the present embodiment includes a control unit 201, an image capturing unit 202, a nonvolatile memory 203, a working memory 204, an operation unit 205, a display unit 206, a recording medium 207, and a sound input unit 210. Basic functions of these elements are similar to the image capture apparatus 100, and a detailed description thereof is omitted.

The information processing apparatus 200 of the present embodiment includes a control unit 201, an image capturing unit 202, a nonvolatile memory 203, a working memory 204, an operation unit 205, a display unit 206, a recording medium 207, and a connection unit 208. Basic functions of these elements are similar to the image capture apparatus 100, and a detailed description thereof is omitted.

Also, an operating system (OS), which is basic software executed by the control unit 201, and an application that realizes applicative functions in coordination with this OS are recorded in the nonvolatile memory 203. Furthermore, an application for realizing communication processing and control processing with the image capture apparatus 100 is stored in the nonvolatile memory 203.

The connection unit 208 includes a communication interface for performing wired or wireless communication with an external apparatus such as the image capture apparatus 100. The information processing apparatus 200 of the present embodiment can exchange data with an external apparatus via the connection unit 208. The information processing apparatus 200 of the present embodiment can transmit control information to the image capture apparatus 100, and it can receive image data and audio data generated by the image capture apparatus 100 from the information processing apparatus 200 via the connection unit 208. The connection unit 208 of the present embodiment includes a wired communication interface such as USB. The control unit 201 realizes communication with an external apparatus by controlling the connection unit 208. The connection unit 208 may be connected directly to the image capture apparatus 100, or it may be connected thereto via an external apparatus. A protocol for data communication can use, for example, the UVC/UAC function that has been standardized based on USB. Note that no limitation is intended by USB, and the connection unit 208 can include an infrared communication interface and a wireless communication interface such as Bluetooth® and Wireless USB. Furthermore, a wired connection interface such as HDMI and IEEE 1394 may be used.

A sound output unit 209 is a speaker that converts analog audio signals generated by the sound input unit 210 into sounds, and outputs the sounds to the outside.

A public network connection unit 211 is an interface that is used in performing wireless communication via a wide area network (WAN) such as 4G/LTE and 5G. The information processing apparatus 200 can make a telephone call and perform data communication with other devices via the public network connection unit 211. During a telephone call, audio signals are input to and output from the control unit 201 via the sound input unit 210 and the sound output unit 209. In the present embodiment, the public network connection unit 211 is not limited to using 4G/LTE and 5G, and it may use other communication methods such as local 5G, WiMAX, ADSL, and FTTH. Note that the connection unit 208 and the public network connection unit 211 need not necessarily be configured using independent items of hardware; for example, one antenna may operate as both of them.

<Operation Sequence of Image Capture Apparatus 100 and Information Processing Apparatus 200>

Figure 3A:
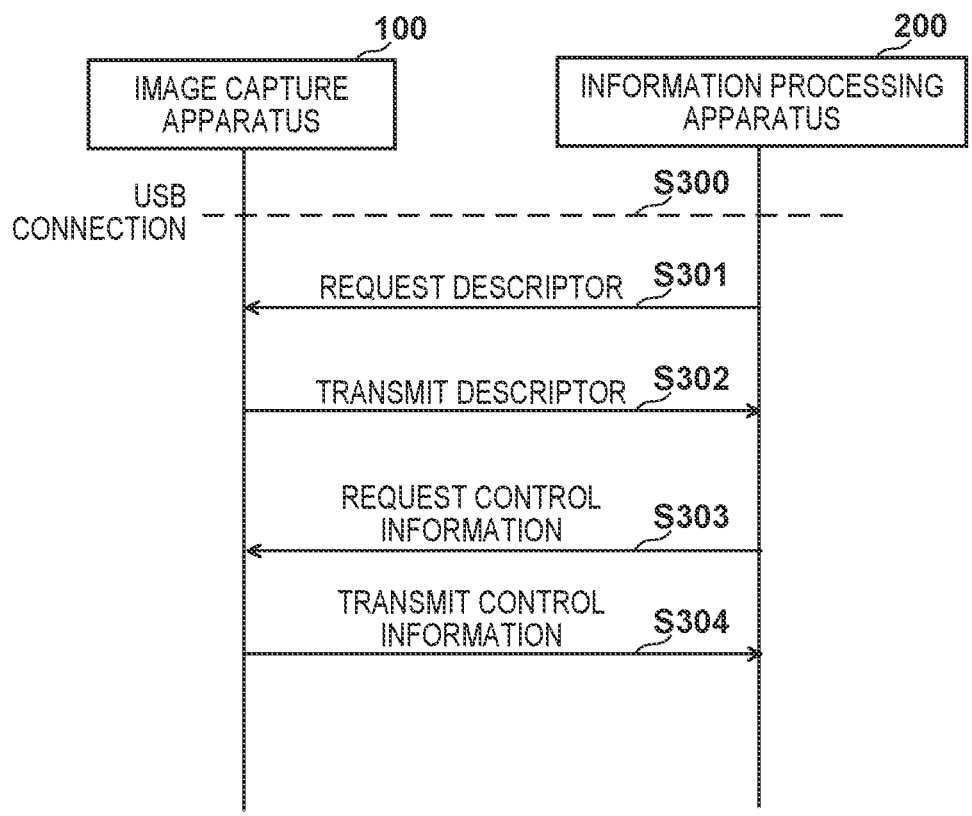
FIG. 3A is a diagram exemplarily showing an operational sequence for a case where the image capture apparatus and the information processing apparatus of the present embodiment have been connected to each other via USB.
Figure 3B:
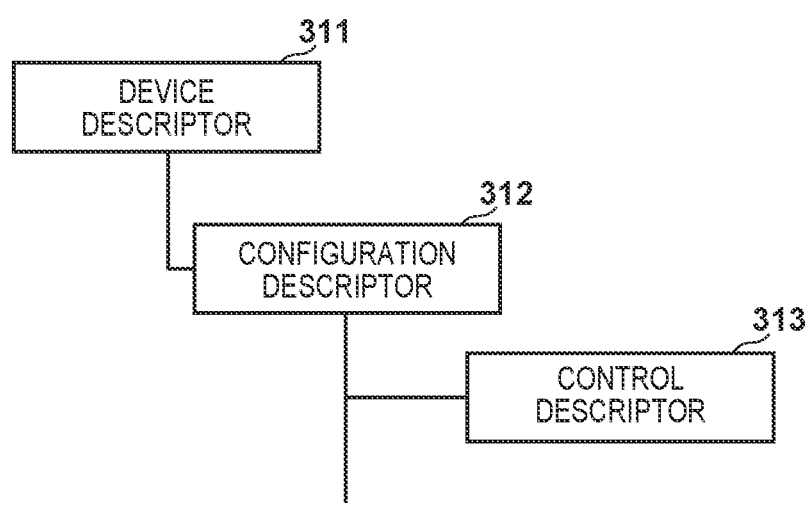
FIG. 3B is a diagram exemplarily showing information that is exchanged between apparatuses in a case where the image capture apparatus and the information processing apparatus of the present embodiment have been connected to each other via USB.

Next, with reference to FIGS. 3A and 3B, a description is given of an operational sequence for a case where the image capture apparatus 100 and the information processing apparatus 200 of the present embodiment have been connected to each other via USB.

Figure 1B:
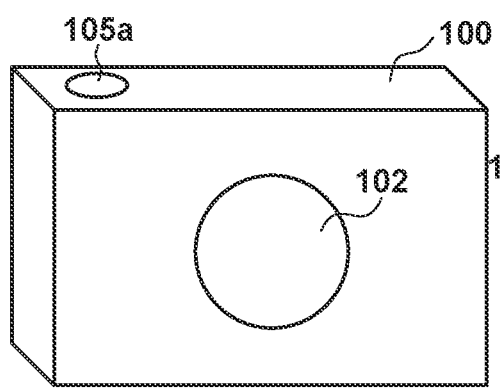
FIG. 1B is a front view showing the configuration of the image capture apparatus according to the present embodiment.
Figure 1C:
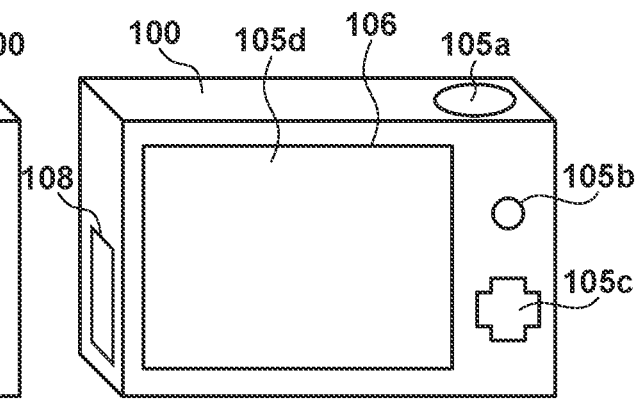
FIG. 1C is a back view showing the configuration of the image capture apparatus according to the present embodiment.
Figure 2:
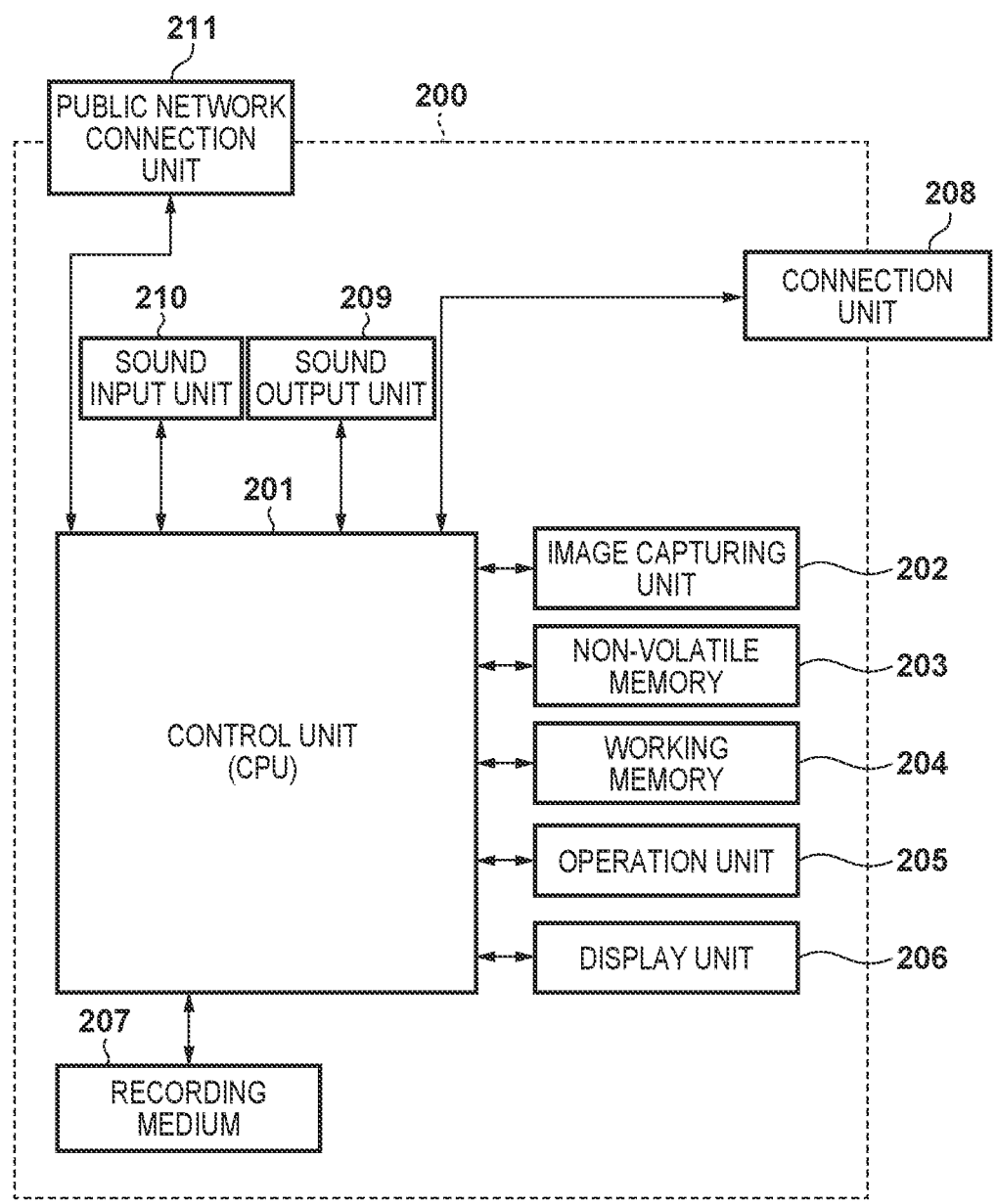
FIG. 2 is a block diagram showing a configuration of an information processing apparatus according to the present embodiment.

Note that although the processing of FIG. 3A is described using the image capture apparatus 100 and the information processing apparatus 200 as the main executors of control, in reality, the processing is realized as the control unit 101 of the image capture apparatus 100 shown in FIG. 1A controls respective components by executing a program stored in the nonvolatile memory 103, and the control unit 201 of the information processing apparatus 200 shown in FIG. 2 controls respective components by executing a program stored in the nonvolatile memory 203.

FIG. 3A is a sequence diagram showing the operations for a case where the image capture apparatus 100 and the information processing apparatus 200 of the present embodiment have been connected to each other via USB.

In step S300, the image capture apparatus 100 and the information processing apparatus 200 are connected to each other via USB. The image capture apparatus 100 transmits information called a descriptor, which includes a type and a configuration of a USB device, to the information processing apparatus 200. The OS of the information processing apparatus 200 recognizes the type and configuration of the image capture apparatus 100 as the USB device by analyzing the descriptor received from the image capture apparatus 100.

In step S301, the information processing apparatus 200 transmits a request for obtainment of a descriptor to the image capture apparatus 100.

In step S302, the image capture apparatus 100 transmits a descriptor to the information processing apparatus 200.

FIG. 3B exemplarily shows a data structure of the descriptor.

The descriptor includes a device descriptor 311, a configuration descriptor 312, and a control descriptor 313.

The device descriptor 311 describes such information as a USB standard with which the image capture apparatus 100 is compatible, a device class, a protocol, a vendor ID, and a product ID.

The configuration descriptor 312 describes such information as electric power (bus power) supplied to the image capture apparatus 100 and electric power consumed by the image capture apparatus 100.

The control descriptor 313 describes first information indicating that the information processing apparatus 200 can control the image capture apparatus 100 in a case where the image capture apparatus 100 and the information processing apparatus 200 are compatible with the UVC/UAC function.

In the present embodiment, in a case where the information processing apparatus 200 is compatible with the UVC/UAC function, the information processing apparatus 200 analyzes information described in the control descriptor 313 upon receiving the control descriptor 313 from the image capture apparatus 100. Then, in a case where the information processing apparatus 200 has determined that the image capture apparatus 100 is compatible with the UVC/UAC function, it transmits a request for control information for controlling the image capture apparatus 100 (second information) to the image capture apparatus 100. Based on the control information received from the image capture apparatus 100, an application of the information processing apparatus 200 displays a UI screen on which shooting parameters for controlling the image capture apparatus 100 can be set. A user can set the shooting parameters for controlling the image capture apparatus 100 via the UI screen.

Furthermore, in a case where the information processing apparatus 200 does not support the UVC/UAC function, the information processing apparatus 200 does not transmit a request for control information to the image capture apparatus 100 even when the control descriptor has been received from the image capture apparatus 100. In a case where a request for control information is not transmitted from the information processing apparatus 200 after the control descriptor 313 has been transmitted to the information processing apparatus 200, the image capture apparatus 100 of the present embodiment can determine that the information processing apparatus 200 is not compatible with the UVC/UAC function. In this way, the image capture apparatus 100 of the present embodiment controls whether the image capture apparatus 100 transitions to a standby state where the UVC/UAC function can be executed in accordance with whether the information processing apparatus 200 is compatible with the UVC/UAC function. Furthermore, in a case where the information processing apparatus 200 is not compatible with the UVC/UAC function, the image capture apparatus 100 of the present embodiment provides the user with a notification indicating that the UVC/UAC function cannot be executed without transitioning to the standby state where the UVC/UAC function can be executed.

Note that in a case where the image capture apparatus 100 is not compatible with the UVC/UAC function, the image capture apparatus 100 need not transmit the control descriptor 313 to the information processing apparatus 200. However, in this case, the image capture apparatus 100 does not receive a request for control information from the information processing apparatus 200 regardless of whether the information processing apparatus 200 is compatible with the UVC/UAC function. Therefore, whether the information processing apparatus 200 is compatible with the UVC/UAC function cannot be determined. For this reason, in the present embodiment, the control descriptor 313 is transmitted to the information processing apparatus 200 regardless of whether the image capture apparatus 100 is compatible with the UVC/UAC function. Then, the image capture apparatus 100 determines whether the information processing apparatus 200 is compatible with the UVC/UAC function in accordance with whether a request for control information has been received from the information processing apparatus 200.

In step S303, in a case where the information processing apparatus 200 is compatible with the UVC/UAC function, the information processing apparatus 200 analyzes information described in the control descriptor 313 that has been received from the image capture apparatus 100 in step S302. Then, in a case where the information processing apparatus 200 has determined that the image capture apparatus 100 is compatible with the UVC/UAC function, it transmits a request for control information that can be set in the image capture apparatus 100 to the image capture apparatus 100. The control information includes information related to parameters that can be set, such as brightness, a magnification factor, tint, sharpness, and the like for adjusting the image quality of images, and zoom, focus, pan, tilt, and the like for controlling shooting operations.

In step S304, the image capture apparatus 100 transmits control information that can be set in the image capture apparatus 100 to the information processing apparatus 200 based on the request for control information that has been received from the information processing apparatus 200 in step S303.

In the present embodiment, in a case where the image capture apparatus 100 is compatible with the UVC/UAC function, the image capture apparatus 100 transmits, to the information processing apparatus 200, the control descriptor 313 that includes such information as initial values, maximum values, and minimum values of image capture parameters that can be controlled in the image capture apparatus 100. Meanwhile, in a case where the image capture apparatus 100 is not compatible with the UVC/UAC function, the image capture apparatus 100 transmits, to the information processing apparatus 200, the control descriptor 313 that includes information in which initial values, maximum values, minimum values, and the like of image capture parameters that can be controlled in the image capture apparatus 100 are set at 0. As descried above, the image capture apparatus 100 provides the information processing apparatus 200 with a notification indicating that the image capture apparatus 100 is not compatible with the UVC/UAC function by transmitting, to the information processing apparatus 200, information in which initial values, maximum values, and minimum values of shooting parameters are set at 0. In this way, the information processing apparatus 200 can recognize that the image capture apparatus 100 is not compatible with the UVC/UAC function. The details of the control descriptor will be described later using FIGS. 5A and 5B.

<Control Processing of Image Capture Apparatus>

Figure 4A:
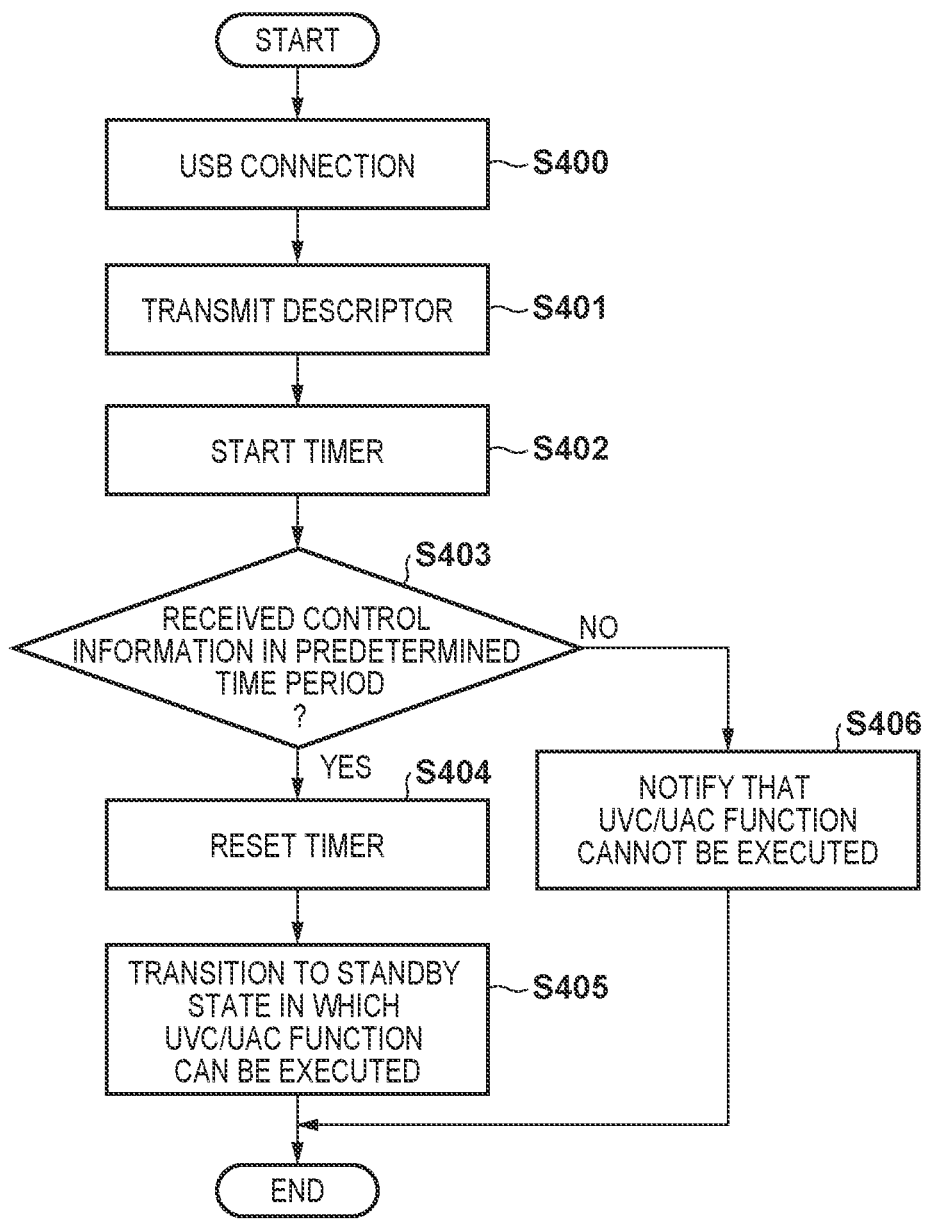
FIG. 4A is a flowchart showing control processing of the image capture apparatus for a case where the information processing apparatus of the present embodiment has been connected thereto via USB.
Figure 4B:
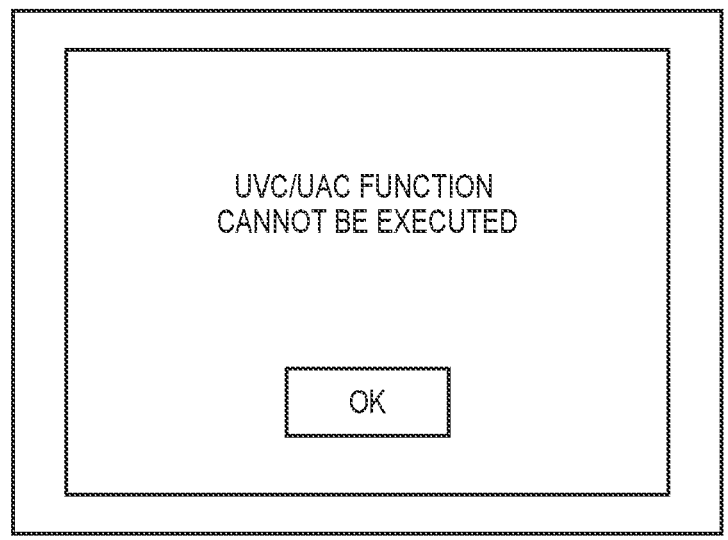
FIG. 4B is a diagram exemplarily showing a screen that is displayed on the image capture apparatus in a case where the information processing apparatus of the present embodiment is not compatible with the UVC/UAC function.
Figure 4C:
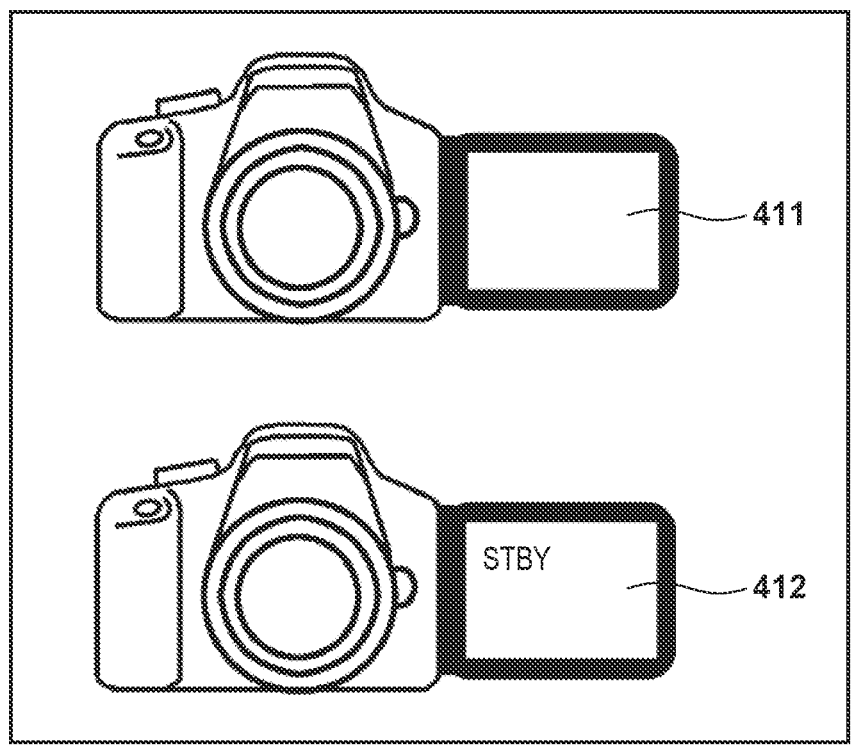
FIG. 4C is a diagram exemplarily showing screens that are displayed on the image capture apparatus before and after the image capture apparatus of the present embodiment transitions to a standby state where the UVC/UAC function can be executed.

Next, with reference to FIGS. 4A to 4C, a description is given of control processing of the image capture apparatus 100 for a case where the information processing apparatus 200 of the present embodiment has been connected via USB.

FIG. 4A is a flowchart showing control processing of the image capture apparatus 100 for a case where the information processing apparatus 200 of the present embodiment has been connected thereto via USB.

The processing of FIG. 4A is realized as the control unit 101 of the image capture apparatus 100 shown in FIG. 1A controls respective components by executing a program stored in the nonvolatile memory 103.

In step S400, the connection unit 108 is connected to the connection unit 208 of the information processing apparatus 200, and the control unit 101 is connected to the control unit 201 of the information processing apparatus 200 via USB. Until processing of later-described step S402, the image capture apparatus 100 does not transition to a standby state where the UVC/UAC function can be executed, and the display unit 106 of the image capture apparatus 100 does not present a display indicating that the apparatus is in the standby state where the UVC/UAC function can be executed as shown in FIG. 4C.

In step S401, the control unit 101 transmits a descriptor including a control descriptor 313 to the information processing apparatus 200 in response to reception of a request for a descriptor from the information processing apparatus 200 that has been connected in step S400.

In step S402, the control unit 101 uses a timer to measure a time period that has elapsed since the descriptor has been transmitted to the information processing apparatus 200 in step S401.

In step S403, the control unit 101 determines whether a request for control information has been received from the information processing apparatus 200 within a predetermined time period since the timer started the time measurement in step S402. In a case where the control unit 101 has determined that a request for control information has been received from the information processing apparatus 200 within the predetermined time period since the timer started the time measurement in step S402, processing proceeds to step S404. In a case where the control unit 101 has determined that a request for control information has not been received from the information processing apparatus 200 within the predetermined time period since the timer started the time measurement in step S402, processing proceeds to step S406.

In a case where the information processing apparatus 200 is compatible with the UVC/UAC function, the information processing apparatus 200 that has received the control descriptor 313 from the image capture apparatus 100 transmits a request for control information to the image capture apparatus 100. In a case where the information processing apparatus 200 is not compatible with the UVC/UAC function, the information processing apparatus 200 does not transmit a request for control information to the image capture apparatus 100. In this way, the control unit 101 can determine whether the information processing apparatus 200 is compatible with the UVC/UAC function in accordance with whether a request for control information has been received from the information processing apparatus 200 within the predetermined time period since the control descriptor 313 has been transmitted to the information processing apparatus 200. Although the predetermined time period is set at 300 milliseconds, 500 milliseconds, or the like, the user may be able to set any time period as the predetermined time period.

In step S404, the control unit 101 resets the time measurement using the timer.

In step S405, the control unit 101 transitions to the standby state where the UVC/UAC function can be executed, which is shown in FIG. 4C.

FIG. 4B exemplarily shows a screen that is displayed on the image capture apparatus 100 in a case where the information processing apparatus 200 of the present embodiment is not compatible with the UVC/UAC function. FIG. 4C exemplarily shows screens that are displayed on the image capture apparatus 100 before and after the image capture apparatus 100 of the present embodiment transitions to the standby state where the UVC/UAC function can be executed.

In a case where the image capture apparatus 100 has not transitioned to the standby state where the UVC/UAC function can be executed, the control unit 101 displays, on the display unit 106, a screen 411 of FIG. 4C indicating that the transition to the standby state where the UVC/UAC function can be executed has not been made. The state before the image capture apparatus 100 transitions to the standby state where the UVC/UAC function can be executed corresponds to processing from step S400 to step S402 in FIG. 4A. When a request for control information has been received from the information processing apparatus 200 and the transition to the standby state where the UVC/UAC function can be executed has been made in step S405, the control unit 101 displays, on the display unit 106, a screen 412 of FIG. 4C indicating that the transition to the standby state where the UVC/UAC function can be executed has been made.

In step S406, the control unit 101 determines that the information processing apparatus 200 is not compatible with the UVC/UAC function. Then, without making a transition to the standby state where the UVC/UAC function can be executed, the control unit 101 presents a display indicating that the UVC/UAC function cannot be executed on the display unit 106 as shown in FIG. 4B, and resets the timer that started the time measurement in step S402.

<Description of Control Descriptor>

Next, the control descriptor 313 of the present embodiment will be described.

FIG. 5A exemplarily shows a data structure of the control descriptor 313 that is transmitted to the information processing apparatus 200 in a case where the image capture apparatus 100 of the present embodiment is compatible with the UVC/UAC function. The control descriptor 313 includes, for example, at least one of brightness, a magnification factor, tint, and sharpness, which are shooting parameters for adjusting the image quality of images, as information indicating that the image capture apparatus 100 can be controlled. In the example of FIG. 5A, the control descriptor 313 describes information of initial values, minimum values, and maximum values with respect to the brightness, magnification factor, and tint. The information processing apparatus 200 analyzes the information of the control descriptor 313 received from the image capture apparatus 100. Then, as there are shooting parameters that can be controlled in the image capture apparatus 100, the information processing apparatus 200 determines that the image capture apparatus 100 is compatible with the UVC/UAC function, and it transmits a request for control information to the image capture apparatus 100.

FIG. 5B exemplarily shows a data structure of the control descriptor 313 that is transmitted to the information processing apparatus 200 in a case where the image capture apparatus 100 of the present embodiment is not compatible with the UVC/UAC function. In a case where the image capture apparatus 100 is not compatible with the UVC/UAC function, 0 is described as information of initial values, minimum values, and maximum values of all of the brightness, magnification factor, tint, and sharpness included in the control descriptor 313. The information processing apparatus 200 analyzes the information of the control descriptor 313 received from the image capture apparatus 100. Then, as there are no shooting parameters that can be controlled in the image capture apparatus 100, the information processing apparatus 200 determines that the image capture apparatus 100 is not compatible with the UVC/UAC function, and it does not transmit a request for control information to the image capture apparatus 100.

According to the present embodiment, when the image capture apparatus 100 has been connected to the information processing apparatus 200 via USB, it transitions to the standby state where the UVC/UAC function can be executed in a case where the information processing apparatus 200 is compatible with the UVC/UAC function. Also, in a case where the information processing apparatus 200 is not compatible with the UVC/UAC function, a notification indicating that the UVC/UAC function cannot be executed is provided without making a transition to the standby state where the UVC/UAC function can be executed. This can prevent a user from mistakenly recognizing that the UVC/UAC function can be executed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-182799, filed Nov. 15, 2022 which is hereby incorporated by reference herein in its entirety.

What is claimed is:

1. An image capture apparatus comprising:
a connection unit that connects to an information processing apparatus via a general-purpose interface so as to enable communication with the information processing apparatus; and
a control unit that
transitions to a standby state where a predetermined function that controls the image capture apparatus via the general-purpose interface can be executed in a case where a request for second information for controlling the image capture apparatus has been received from the information processing apparatus in response to transmission of first information indicating that the image capture apparatus can be controlled via the general-purpose interface to the information processing apparatus, and
provides a notification indicating that the predetermined function cannot be executed without transitioning to the standby state where the predetermined function can be executed in a case where the request for the second information has not been received from the information processing apparatus in response to transmission of the first information to the information processing apparatus.

2. The apparatus according to claim 1, wherein
the control unit
transmits the first information to the information processing apparatus upon receiving a request for the first information from the information processing apparatus,
transitions to the standby state where the predetermined function can be executed in a case where the request for the second information has been received from the information processing apparatus in response to transmission of the first information to the information processing apparatus, and
provides the notification indicating that the predetermined function cannot be executed without transitioning to the standby state where the predetermined function can be executed in a case where the request for the second information has not been received from the information processing apparatus in response to transmission of the first information to the information processing apparatus.

3. The apparatus according to claim 1, wherein
the control unit starts time measurement using a timer after transmitting the first information to the information processing apparatus.

4. The apparatus according to claim 3, wherein
the control unit resets the time measurement using the timer and transitions to the standby state where the predetermined function can be executed in a case where the request for the second information has been received from the information processing apparatus within a predetermined time period since the start of the time measurement using the timer.

5. The apparatus according to claim 3, wherein
the control unit provides the notification in a case where the request for the second information has not been received from the information processing apparatus within a predetermined time period since the start of the time measurement using the timer.

6. The apparatus according to claim 1, further comprising a display unit that provides a notification indicating that the predetermined function cannot be executed.

7. The apparatus according to claim 1, wherein
the general-purpose interface includes Universal Serial Bus (USB).

8. The apparatus according to claim 7, wherein
the predetermined function is a USB video class (UVC) that has been standardized based on the USB.

9. The apparatus according to claim 8, wherein
the first information includes a shooting parameter with which the image capture apparatus can be controlled.

10. The apparatus according to claim 9, wherein
the shooting parameter includes at least one of brightness, a magnification factor, tint, and sharpness of an image generated by the image capture apparatus.

11. The apparatus according to claim 9, wherein
in a case where the image capture apparatus can execute the predetermined function, the control unit transmits the first information that describes an initial value, a minimum value, and a maximum value of the shooting parameter to the information processing apparatus, and
in a case where the image capture apparatus cannot execute the predetermined function, the control unit transmits the first information that describes 0 as the initial value, the minimum value, and the maximum value of the shooting parameter to the information processing apparatus.

12. A method of controlling an image capture apparatus, comprising:
connecting to an information processing apparatus via a general-purpose interface so as to enable communication with the information processing apparatus;
transitioning to a standby state where a predetermined function that controls the image capture apparatus via the general-purpose interface can be executed in a case where a request for second information for controlling the image capture apparatus has been received from the information processing apparatus in response to transmission of first information indicating that the image capture apparatus can be controlled via the general-purpose interface to the information processing apparatus; and providing a notification indicating that the predetermined function cannot be executed without transitioning to the standby state where the predetermined function can be executed in a case where the request for the second information has not been received from the information processing apparatus in response to transmission of the first information to the information processing apparatus.

13. A non-transitory computer-readable storage medium storing a program for causing a computer to function as an image capture apparatus comprising:
   a connection unit that connects to an information processing apparatus via a general-purpose interface so as to enable communication with the information processing apparatus; and
   a control unit that transitions to a standby state where a predetermined function that controls the image capture apparatus via the general-purpose interface can be executed in a case where a request for second information for controlling the image capture apparatus has been received from the information processing apparatus in response to transmission of first information indicating that the image capture apparatus can be controlled via the general-purpose interface to the information processing apparatus, and
   provides a notification indicating that the predetermined function cannot be executed without transitioning to the standby state where the predetermined function can be executed in a case where the request for the second information has not been received from the information processing apparatus in response to transmission of the first information to the information processing apparatus.

* * * * *